United States Patent
Matsui et al.

(10) Patent No.: US 9,165,041 B2
(45) Date of Patent: Oct. 20, 2015

(54) PRODUCTS INFORMATION MANAGEMENT ASSISTANCE APPARATUS

(75) Inventors: Takaharu Matsui, Miura (JP); Noriyuki Haga, Yokohama (JP); Shinichi Taniguchi, Yokohama (JP); Junichi Hamano, Yokosuka (JP); Tomotoshi Ishida, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 174 days.

(21) Appl. No.: 13/983,062

(22) PCT Filed: Jan. 23, 2012

(86) PCT No.: PCT/JP2012/000362
§ 371 (c)(1),
(2), (4) Date: Aug. 1, 2013

(87) PCT Pub. No.: WO2012/132170
PCT Pub. Date: Oct. 4, 2012

(65) Prior Publication Data
US 2013/0318103 A1 Nov. 28, 2013

(30) Foreign Application Priority Data
Mar. 30, 2011 (JP) .................................. 2011-073884

(51) Int. Cl.
G06F 17/30 (2006.01)
G06Q 50/04 (2012.01)

(52) U.S. Cl.
CPC ............ *G06F 17/3053* (2013.01); *G06Q 50/04* (2013.01)

(58) Field of Classification Search
CPC .......... G06F 17/3053; G06F 17/30864; G06F 17/30038; G06F 17/30265
USPC .......................................................... 707/749
See application file for complete search history.

(56) References Cited

U.S. PATENT DOCUMENTS

| 6,889,107 | B2 | 5/2005 | Yuda et al. | |
|---|---|---|---|---|
| 2005/0278292 | A1* | 12/2005 | Ohi et al. | 707/1 |
| 2006/0190096 | A1* | 8/2006 | Hotta et al. | 700/12 |
| 2013/0318103 | A1* | 11/2013 | Matsui et al. | 707/749 |

FOREIGN PATENT DOCUMENTS

JP 2004-234399 8/2004

* cited by examiner

*Primary Examiner* — Cam-Y Truong
(74) *Attorney, Agent, or Firm* — Baker Botts L.L.P.

(57) ABSTRACT

The disclosed invention provides a technique that assists in selecting a proper standard part independently of production achievements of parts and information which is arbitrarily input by a user regarding specification items to decide on a similarity between parts. Disclosed is a products information management assistance apparatus that decides on standard part information based on past products information records. The apparatus includes a products information storing unit that stores information on parts registered in records such as required specifications in the past, parts organization, parts specifications, and cost; a similarity-between-parts calculating unit that calculates a similarity between parts registered in records from parts specifications, a parts standardization effect calculating unit that calculates an effect if the above parts have been standardized in a scope in which they are grouped by similarity; and a standardization analysis result display unit that displays the parts standardization scope and standardization effect together.

4 Claims, 11 Drawing Sheets

| PART TYPE ID | PART NAME |
|---|---|
| V0001 | XXX MOTOR |
| V0002 | YYY PUMP |
| V0003 | ZZZ VALVE |
| ⋮ | ⋮ |

| EFFECT INDICATOR ID | EFFECT INDICATOR NAME |
|---|---|
| EFFECT INDICATOR 1 | PURCHASE COST REDUCTION RATE |
| EFFECT INDICATOR 2 | DESIGN COST REDUCTION RATE |
| EFFECT INDICATOR 3 | INSPECTION COST REDUCTION RATE |
| ⋮ | ⋮ |

| ANALYSIS HISTORY ID | PART TYPE ID | EFFECT INDICATOR ID | TARGET LEVEL OF EFFECT |
|---|---|---|---|
| ANALYSIS HISTORY 1 | V0001 | EFFECT INDICATOR 1 | 20.0 |
| ANALYSIS HISTORY 2 | V0001 | EFFECT INDICATOR 2 | 10.0 |
| ANALYSIS HISTORY 3 | V0002 | EFFECT INDICATOR 1 | 15.0 |
| ⋮ | ⋮ | ⋮ | ⋮ |

| PART ID | PART TYPE ID | CASE ID | STD. PART ID | PURCHASE COST | ... | OUTPUT[kw] | MATERIAL | NOISE[dBA] | ... |
|---|---|---|---|---|---|---|---|---|---|
| P000001 | V0001 | X0001 |  | 230 | ... | 50 | CARBON STEEL | 85 | ... |
| P000002 | V0001 | X0002 |  | 290 | ... | 100 | CARBON STEEL | 90 | ... |
| P000003 | V0001 | X0003 | P000003 | 210 | ... | 50 | CARBON STEEL | 90 | ... |
| P000004 | V0001 | X0004 | P000004 | 270 | ... | 50 | STAINLESS STEEL | 95 | ... |
| P000005 | V0001 | X0005 |  | 220 | ... | 50 | CARBON STEEL | 85 | ... |
| P000006 | V0001 | X0006 | P000006 | 225 | ... | 50 | STAINLESS STEEL | 90 | ... |
| P000007 | V0001 | X0007 | P000007 | 305 | ... | 100 | STAINLESS STEEL | 80 | ... |
| P000008 | V0001 | X0008 | P000008 | 290 | ... | 100 | STAINLESS STEEL | 85 | ... |
| P000009 | V0001 | X0009 | P000009 | 260 | ... | 50 | STAINLESS STEEL | 90 | ... |
| P000010 | V0001 | X0010 |  | 220 | ... | 100 | CARBON STEEL | 95 | ... |
| P000011 | V0001 | X0011 | P000011 | 300 | ... | 50 | STAINLESS STEEL | 75 | ... |
| P000012 | V0001 | X0012 |  | 215 | ... | 100 | CARBON STEEL | 95 | ... |
| P000013 | V0001 | X0013 |  | 280 | ... | 100 | CARBON STEEL | 90 | ... |
| P000014 | V0001 | X0014 | P000014 | 275 | ... | 100 | CARBON STEEL | 95 | ... |
| P000015 | V0001 | X0015 | P000015 | 295 | ... | 100 | STAINLESS STEEL | 80 | ... |
| ... | ... | ... | ... | ... | ... | ... | ... | ... | ... |

| PART ID | OUTPUT[kw] | MATERIAL: CARBON STEEL | MATERIAL: STAINLESS STEEL | NOISE[dBA] | ... |
|---|---|---|---|---|---|
| P000001 | 0.00 | 1.00 | 0.00 | 0.50 | ... |
| P000002 | 1.00 | 1.00 | 0.00 | 0.75 | ... |
| P000003 | 0.00 | 1.00 | 0.00 | 0.75 | ... |
| P000004 | 0.00 | 0.00 | 1.00 | 1.00 | ... |
| P000005 | 0.00 | 1.00 | 0.00 | 0.50 | ... |
| P000006 | 0.00 | 0.00 | 1.00 | 0.75 | ... |
| P000007 | 1.00 | 0.00 | 1.00 | 0.25 | ... |
| P000008 | 1.00 | 0.00 | 1.00 | 0.50 | ... |
| P000009 | 0.00 | 0.00 | 1.00 | 0.75 | ... |
| P000010 | 1.00 | 1.00 | 0.00 | 1.00 | ... |
| P000011 | 0.00 | 0.00 | 1.00 | 0.00 | ... |
| P000012 | 1.00 | 1.00 | 0.00 | 1.00 | ... |
| P000013 | 1.00 | 1.00 | 0.00 | 0.75 | ... |
| P000014 | 1.00 | 1.00 | 0.00 | 1.00 | ... |
| P000015 | 1.00 | 0.00 | 1.00 | 0.25 | ... |
| ⋮ | ⋮ | ⋮ | ⋮ | ⋮ | ... |

| PART ID \ PART ID | P000001 | P000002 | P000003 | ... | P000015 |
|---|---|---|---|---|---|
| P000001 |  | 0.32 | 0.95 | ... | 0.21 |
| P000002 | 0.32 |  | 0.37 | ... | 0.62 |
| P000003 | 0.95 | 0.37 |  | ... | 0.24 |
| ⋮ | ⋮ | ⋮ | ⋮ |  | ⋮ |
| P000015 | 0.21 | 0.62 | 0.24 | ... |  |

| CLUSTER NUMBER | INTER-CLUSTER DISTANCE | THRESHOLD OF SIMILARITY BETWEEN PARTS | CLUSTER ID | PART IDS IN CLUSTER |
|---|---|---|---|---|
| ⋮ | ⋮ | ⋮ | ⋮ | ⋮ |
| 11 | 1.55 | 0.94 | 11-1 | P000001,P000003,P000010 |
| ⋮ | ⋮ | ⋮ | ⋮ | ⋮ |
| 9 | 2.79 | 0.82 | 9-1 | P000001,P000003,P000005,P000010,P000012 |
| 9 | 2.79 | 0.82 | 9-2 | P000002,P000013,P000014 |
| 9 | 2.79 | 0.82 | 9-3 | P000004 |
| 9 | 2.79 | 0.82 | 9-4 | P000006 |
| 9 | 2.79 | 0.82 | 9-5 | P000007 |
| 9 | 2.79 | 0.82 | 9-6 | P000008 |
| 9 | 2.79 | 0.82 | 9-7 | P000009 |
| 9 | 2.79 | 0.82 | 9-8 | P000011 |
| 9 | 2.79 | 0.82 | 9-9 | P000015 |
| ⋮ | ⋮ | ⋮ | ⋮ | ⋮ |
| 5 | 4.66 | 0.66 | 5-1 | P000001,P000003,P000005,P000010,P000012 |
| ⋮ | ⋮ | ⋮ | ⋮ | ⋮ |

| CLUSTER NUMBER | THRESHOLD OF SIMILARITY BETWEEN PARTS | PURCHASE COST REDUCTION RATE[%] | SELECTION FLAG |
|---|---|---|---|
| ⋮ | ⋮ | ⋮ | ⋮ |
| 11 | 0.94 | 8.0 | 0 |
| ⋮ | ⋮ | ⋮ | ⋮ |
| 9 | 0.82 | 21.0 | 1 |
| ⋮ | ⋮ | ⋮ | ⋮ |
| 9 | 0.66 | 33.0 | 0 |
| ⋮ | ⋮ | ⋮ | ⋮ |

| CLUSTER ID | PART IDS IN CLUSTER | STD. PART ID |
|---|---|---|
| 9-1 | P000001,P000003,P000005,P000010,P000012 | P000003 |
| 9-2 | P000002,P000013,P000014 | P000014 |
| 9-3 | P000004 | P000004 |
| 9-4 | P000006 | P000006 |
| 9-5 | P000007 | P000007 |
| 9-6 | P000008 | P000008 |
| 9-7 | P000009 | P000009 |
| 9-8 | P000011 | P000011 |
| 9-9 | P000015 | P000015 |

PRODUCTS INFORMATION MANAGEMENT ASSISTANCE APPARATUS

BACKGROUND

The present invention relates to a products information management assistance apparatus for use in selecting a standard part based on past products information.

An example of background art in this technical field is found in Japanese Unexamined Patent Application Publication No. 2004-234399 which is hereinafter referred to as Patent Document 1. In this publication, there are descriptions that, as a problem, a user who is going to select a standard part cannot select a proper standard part unless having adequate knowledge of similarity definitions and that a solution includes the following: a multidimensional database that stores multidimensional data representing attributes of a standard part from parts data; a production achievements database that stores production achievements data representing amounts of production of parts; a neighborhood range input device that receives input of a neighborhood range value associated with an attribute name and creates a neighborhood range database; a standard part decision device that reads multidimensional data stored in the multidimensional database and production achievements data stored in the production achievements database, selects a standard part by applying neighborhood range data to the read data on parts, and outputs standard part data; and a display device that displays the standard part data" (refer to Abstract).

SUMMARY

In the above-mentioned Patent Document 1, selecting a standard part based on amounts of production when selecting a standard part from data for a plurality of parts is described as one feature. As for parts having a large amount of production as much as 1000 pieces or more, it is conceivable that there is a single-digit or double-digit difference in the amount of production between a part delivered to meet requirements of an individual customer and a part delivered to meet common requirements of multiple customers. It is thus considered applicable to regard a part having production achievements of, for example, 50 pieces or more as a standard part and a part having production achievements less than 50 pieces as a non-standard part.

As for parts having a small amount of production such as less than 100 pieces, most of them are primarily delivered with separate specifications that meet different requirements of individual customers and the amount of production of parts having the same specifications may be more or less several pieces each. However, such separate specifications do not always only result from complying with definite requirements of a customer. Although common specifications can be applied without problem, there is an aspect that separate specifications are produced for certain reasons such as schedules and costs that differ case by case. Therefore, although there is a need for standardizing even the parts having a small amount of production, it is hard with regard to such parts to select a standard part based on a difference in the amount of production in the same way as for bulk production parts, because, in most cases of small production parts, a difference of only more or less several pieces occurs in the amount of production, as noted in the foregoing.

Besides, in the above-mentioned Patent Document 1, it is left to a user to select specification items to decide on a similarity between parts. With respect to parts having a simple structure, which are only defined by roughly a single digit number of specification items such as dimensions, mass, and shape, set forth in an embodiment, it is considered easy to select specification items to decide on a similarity between parts.

However, with respect to complex parts (such as, e.g., a motor for a hydraulic pump) which have a lot of functions and are defined also in view of a plurality of performance specifications for each function, the number of specification items may be 50 to 100 or over and it is thus considered hard to make an arbitrary selection of specification items to decide on a similarity between parts. Therefore, it is difficult to decide on a similarity between parts relying on an arbitrary selection of specification items and to select a standard part based on such decision.

Therefore, the present invention is intended to provide a technique that assists in selecting a proper standard part independently of production achievements of parts and information which is arbitrarily input by a user regarding specification items to decide on a similarity between parts.

To provide a solution to a challenge implied in the foregoing context, for example, a configuration described in claims is adopted.

The present application includes a plurality of solutions to a challenge implied in the foregoing context and one example of the solutions is set forth below:

A products information management assistance apparatus that decides on standard part information based on past products information records is provided. The products information management assistance apparatus includes a processor, a data storage, and an input/output unit. The data storage stores the following: a first data table including entries of, at least, objective part's type ID, effect indicator ID, and a target value of effect; a second data table including entries of, at least, part ID registered in past delivery records, result indicator, and part specifications; a third data table storing calculation results of similarity between parts; a fourth data table including entries of, at least, cluster number, a distance between clusters, a threshold of similarity between parts, cluster ID, and part IDs in cluster; a fifth data table storing calculation results of standardization effect if a plurality of parts have been standardized and consolidated according to a threshold of similarity between parts per cluster number; and a sixth data table including entries of, at least, cluster ID, part IDs in cluster, and standard part ID. The processor includes the following: a unit that receives data selected and entered by a user in terms of an objective part name, an effect indicator name, and a target value of effect and stores that data into the first data table in the data storage; a similarity-between-parts calculating unit that reads part IDs and part specifications from the second data table, performs a process of normalizing the part specifications, calculates a similarity between an arbitrary pair of parts, and stores calculation results into the third data table, and, besides, selects an arbitrary cluster number less than the number of objective part IDs, calculates a distance between an arbitrary pair of clusters for all combinations of clusters, and stores a minimum value of similarity between parts in each cluster number as a threshold of similarity between parts into the fourth data table; a parts standardization effect calculating unit that calculates a standardization effect per cluster number based on part IDs in cluster from the fourth data table and result indicator data from the second data table and stores calculation results into the fifth data table; a parts standardization analysis result input/output unit that reads standardization effect data from the fifth data table, displays parts standardization analysis results in conjunction with a standardization scope of relevant parts registered in records and a standardization effect onto the input/ output unit, and receives a user-selected threshold of similarity between parts; a standard part decision unit that, based on data of part IDs in cluster for a cluster number associated with the user-selected threshold of similarity between parts from the fourth data table and result indicator data from the second data table, selects from among the parts IDs in cluster a part ID for which the result indicator data is best as a standard part and stores the part ID into the sixth data table; and a standard part data output unit that displays a standard part data output screen onto the input/output unit.

According to the present invention, even for complex parts having a small amount of production and defined by a number of specification items, it is possible to select a standard part based on past products information independently of information which is arbitrarily input by a user. Thereby, parts standardization is enhanced and man-hours of design, production, and inspection can be decreased by making good use of standard parts. Purchasing of standard parts in a focused way can reduce a parts sourcing cost.

Challenges, configurations, and effects other than noted above will be apparent from the following description of an embodiment.

DETAILED DESCRIPTION

An embodiment of a products information management assistance apparatus pertaining to the present invention will be described below by way of the drawings.

Figure 1:
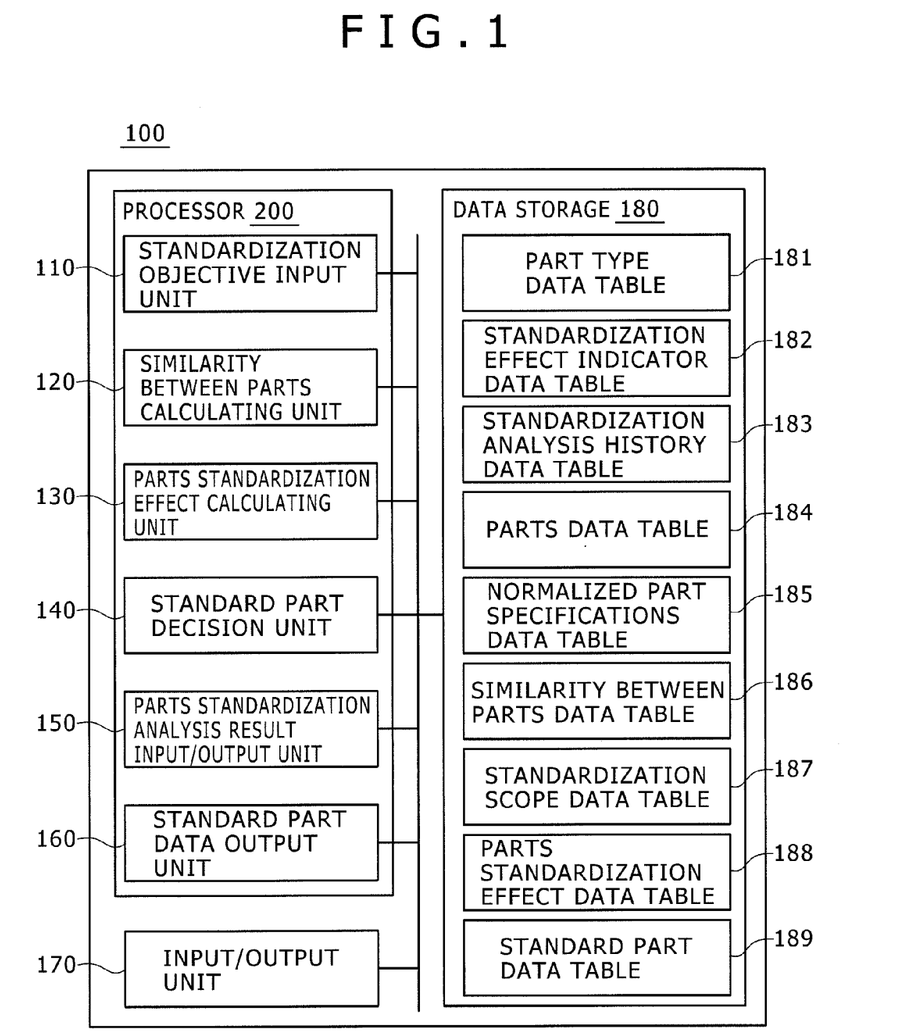
FIG. 1 is a block diagram depicting a schematic configuration example of a products information management assistance apparatus according to an embodiment of the present invention.

A products information management assistance apparatus 100 of the present embodiment outputs a result of parts standardization analysis and a result of standard part selection. As is depicted in FIG. 1, the products information management assistance apparatus 100 is configured as a computer and includes a standardization objective input unit 110, a similarity-between-parts calculating unit 120, a parts standardization effect calculating unit 130, a standard part decision unit 140, a parts standardization analysis result input/output unit 150, a standard part data output unit 160, which are implemented by a processor 200 so as to logically function within the processor 200, an input/output unit 170, and a data storage 180.

The following tables are stored in the data storage 180: a part type data table 181 in which a part type ID uniquely identifying a part type and a part name in past product delivery records are stored in each entry; a standardization effect indicator data table 182 in which an effect indicator ID identifying a standardization effect indicator type and an effect indicator name are stored in each entry; a standardization analysis history data table 183 in which an analysis history ID identifying a processing record of standardization analysis, a part type ID selected by user, an effect indicator ID selected by user, and a target level of effect entered by user for the effect indicator are stored in each entry; a parts data table 184 in which a part ID and a part type ID identifying data on a part in past product delivery records, a case ID identifying a case of product delivery in past product delivery records, a standard part ID identifying a selected standard part, a result indicator such as an actual purchase cost for the part, and particular specifications of the part are stored in each entry; a normalized part specifications data table 185 in which a part ID and normalized part specifications data which is normalized data of the particular specifications of the part are stored in each entry; a similarity between parts data table 186 in which a calculation result of a similarity between parts calculated based on the normalized part specifications data is stored in each entry; a standardization scope data table 187 in which a cluster number identifying the number of groups defining a standardization scope within which a plurality of parts are standardized and consolidated, an inter-cluster distance representing a maximum distance between clusters, a threshold of similarity between parts representing a minimum similarity between parts data included in a cluster, a cluster ID identifying each cluster in each cluster number, and part IDs in a cluster identifying part IDs included in a cluster are stored in each entry; a parts standardization effect data table 188 in which a cluster number, a threshold of similarity between parts, a calculation result of standardization effect (such as a purchase cost reduction rate) if a plurality of parts have been standardized and consolidated according to the threshold of similarity between parts, and selection flag data identifying a result as to whether a user selected the threshold of similarity between parts are stored in each entry; and a standard part data table 189 in which a cluster ID, part IDs in the cluster, and a standard part ID representing a part ID selected as a standard part from a plurality of parts within a standardization scope are stored in each entry.

Figure 2:
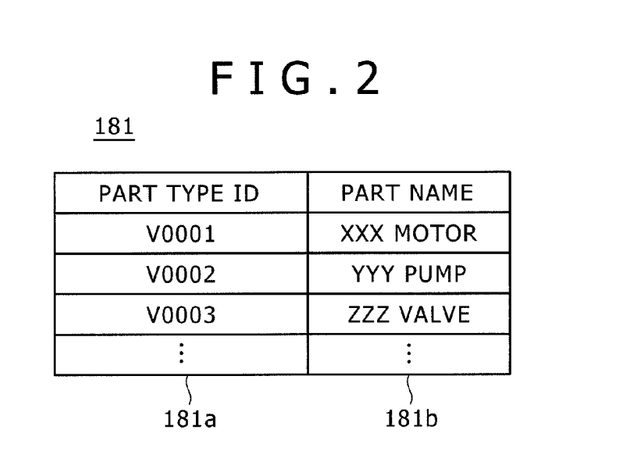
FIG. 2 is a diagram presenting a data structure example of a part type data table according to an embodiment of the present invention.

As is presented in FIG. 2, the part type data table 181 has a part type ID field 181a in which part type IDs are stored and a part name field 181b in which part names are stored. Data is stored in advance in the respective fields 181a, 181b of the part type data table 181 before a user enters various data.

Figure 3:
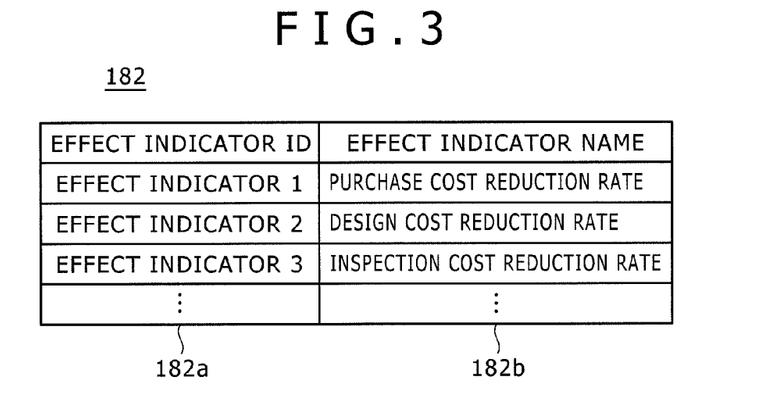
FIG. 3 is a diagram presenting a data structure example of a standardization effect indicator data table according to an embodiment of the present invention.

As is presented in FIG. 3, the standardization effect indicator data table 182 has an effect indicator ID field 182a in which effect indicator IDs are stored and an effect indicator name field 182b in which effect indicator names are stored. Data is stored in advance in the respective fields 182a, 182b of the standardization effect indicator data table 182 before a user enters various data.

Figure 4:
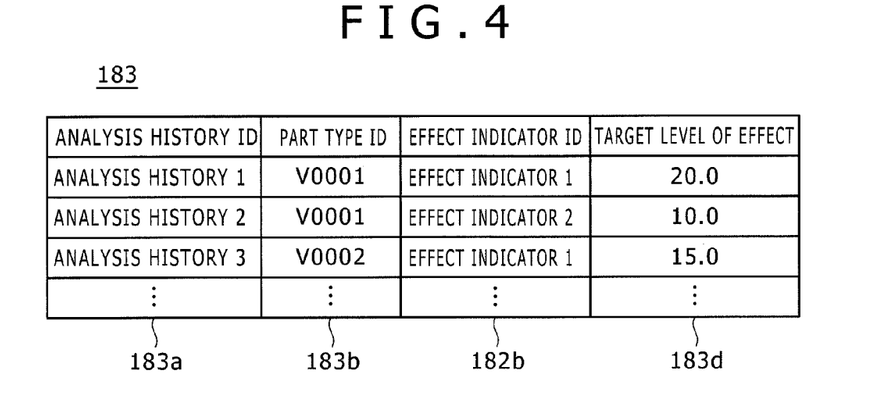
FIG. 4 is a diagram presenting a data structure example of a standardization analysis history data table according to an embodiment of the present invention.

As is presented in FIG. 4, the standardization analysis history data table 183 has an analysis history ID field 183a in which analysis history IDs are stored, a part type ID field 183b in which part type IDs are stored, an effect indicator ID field 183c in which effect indicator IDs are stored, and a target level of effect field 183d in which a target level of effect is stored.

Figure 5:
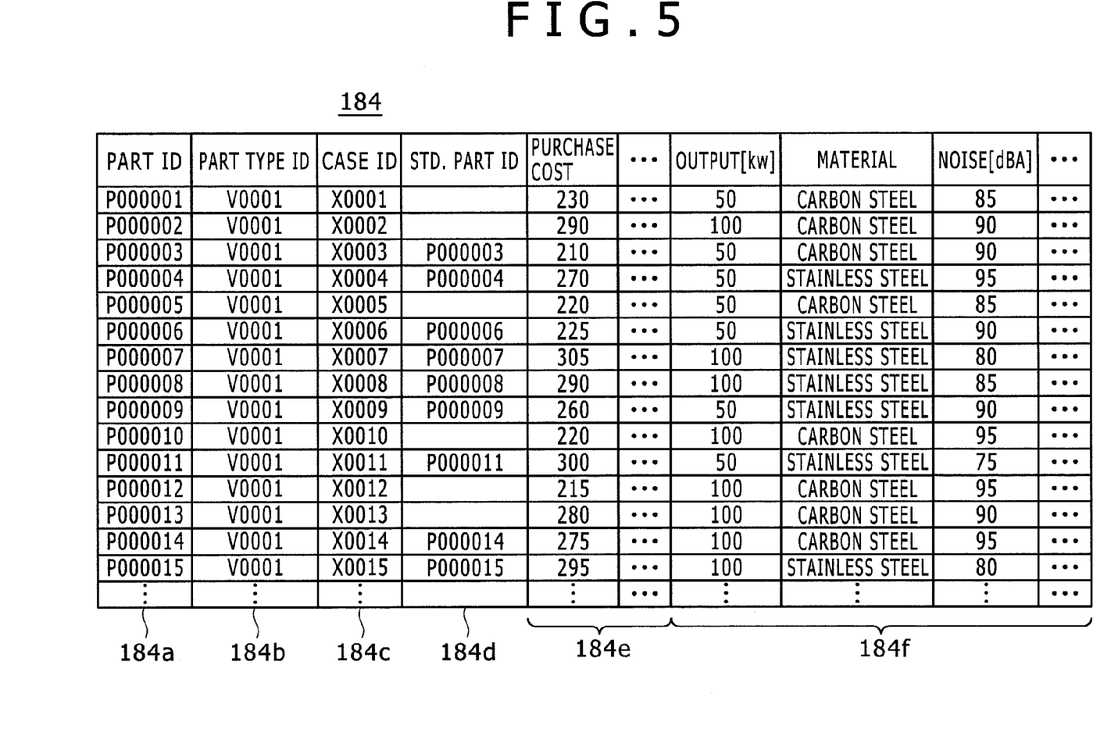
FIG. 5 is a diagram presenting a data structure example of a parts data table according to an embodiment of the present invention.

As is presented in FIG. 5, the parts data table 184 has a part ID field 184a in which part IDs are stored, a part type ID field 184b in which part type IDs are stored, a case ID field 184c in which case IDs are stored, a standard part ID field 184d in which standard part IDs are stored, a result indicator field 184e in which an actual value of a result indicator such as a purchase cost is stored, and particular part specifications fields 184f in which actual data of particular specifications of a part is stored. Data is stored in advance in the respective fields 184a, 184b, 184c, 184d, 184e, 184f of the parts data table 184 before a user enters various data.

Figure 6:
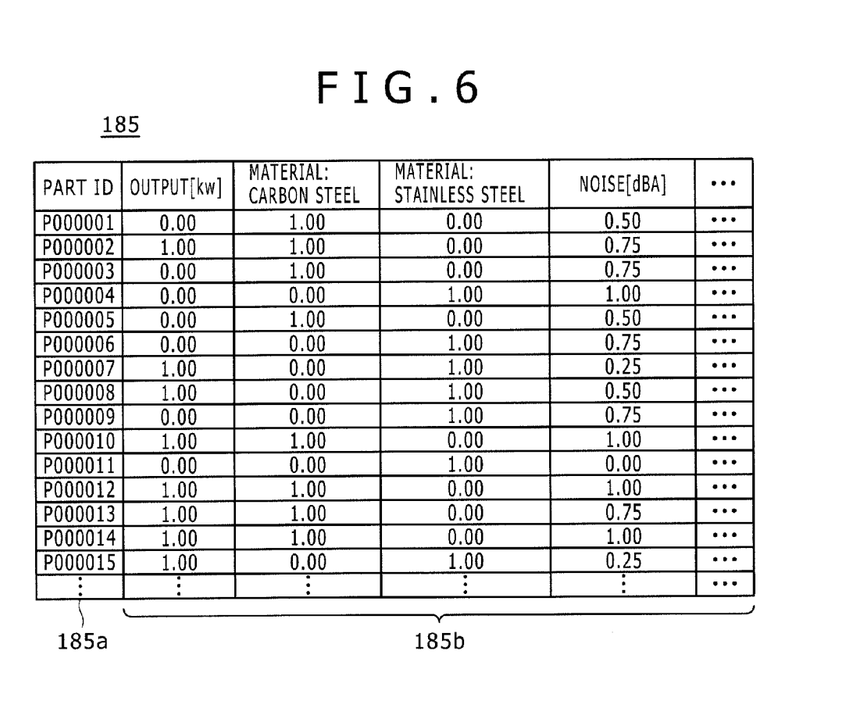
FIG. 6 is a diagram presenting a data structure example of a normalized part specifications data table according to an embodiment of the present invention.

As is presented in FIG. 6, the normalized part specifications data table 185 has a part ID field 185a in which part IDs are stored and normalized part specifications data fields 185b in which normalized part specifications data is stored.

Figure 7:
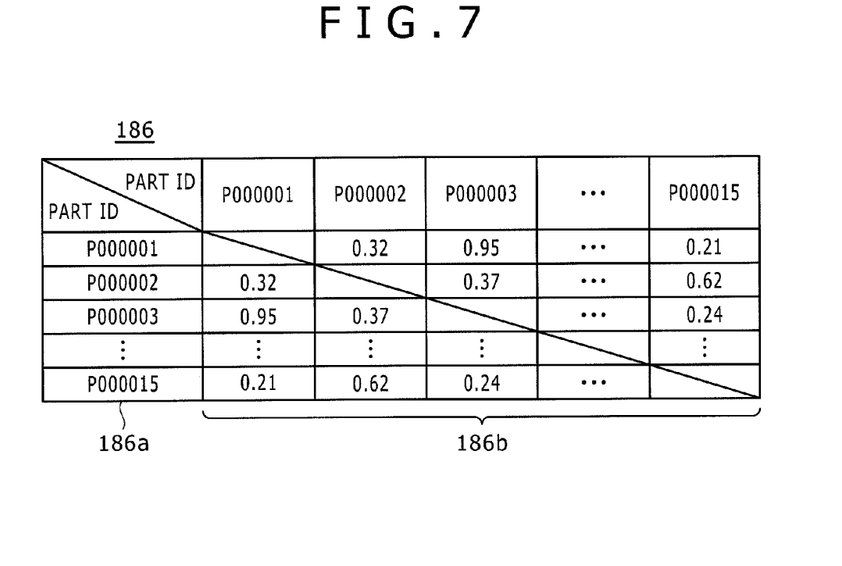
FIG. 7 is a diagram presenting a data structure example of a similarity between parts data table according to an embodiment of the present invention.

As is presented in FIG. 7, the similarity between parts data table 186 has an part ID field 186a in which part IDs are stored and similarity between parts data fields 186b in which data of similarity between parts is stored.

Figure 8:
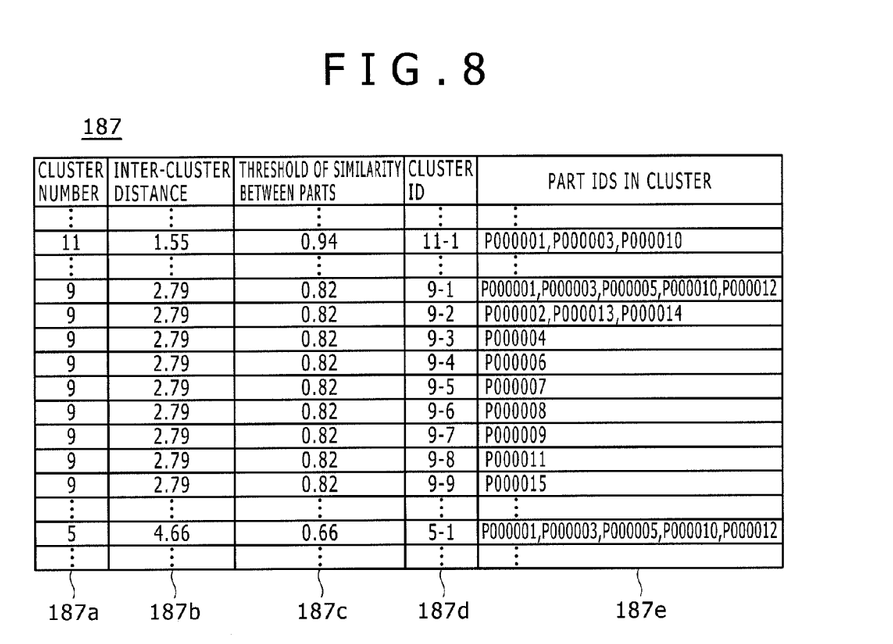
FIG. 8 is a diagram presenting a data structure example of a standardization scope data table according to an embodiment of the present invention.

As is presented in FIG. 8, the standardization scope data table 187 has a cluster number field 187a in which cluster numbers are stored, an inter-cluster distance data field 187b in which inter-cluster distance data is stored, a threshold of similarity between parts data field 187c in which data of a threshold of similarity between parts is stored, a cluster ID field 187d in which cluster IDs are stored, and a part IDs in cluster field 187e in which part IDs in a cluster are stored.

Figure 9:
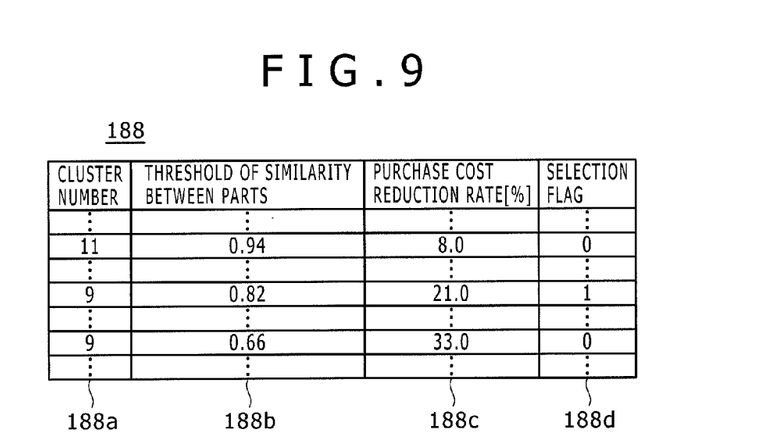
FIG. 9 is a diagram presenting a data structure example of a parts standardization effect data table according to an embodiment of the present invention.

As is presented in FIG. 9, the parts standardization effect data table 188 has a cluster number field 188a in which cluster numbers are stored, a threshold of similarity between parts data field 188b in which data of a threshold of similarity between parts is stored, a standardization effect calculation result field 188c in which a calculation result of standardization effect such as a purchase cost reduction rate is stored, and a selection flag data field 188d in which flag data indicating whether the threshold of similarity between parts is selected is stored.

Figure 10:
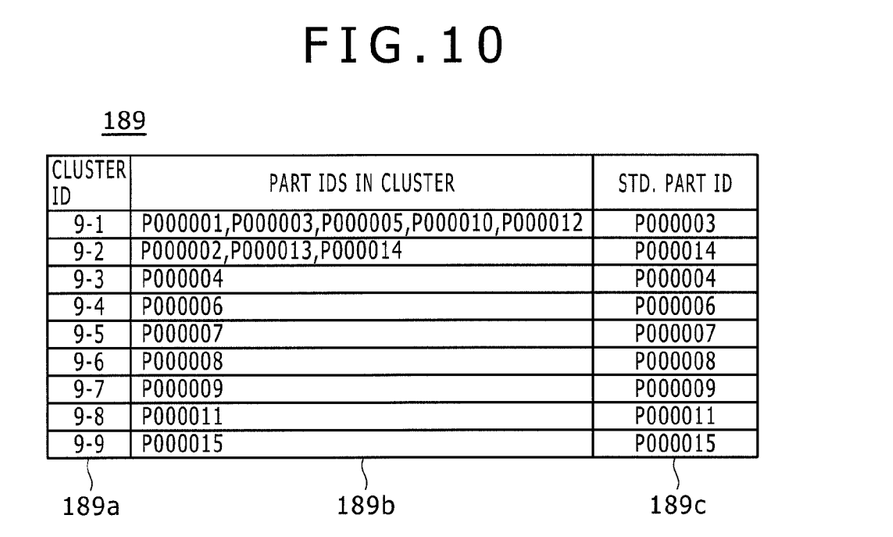
FIG. 10 is a diagram presenting a data structure example of a standard part data table according to an embodiment of the present invention.

As is presented in FIG. 10, the standard part data table 189 has a cluster ID field 189a in which cluster IDs are stored, a part IDs in cluster field 189b in which part IDs in a cluster are stored, and a standard part ID field 189c in which standard part IDs are stored.

Then, how the products information management assistance apparatus 100 operates is described.

According to flowcharts presented in FIGS. 11 through 13, how the products information management assistance apparatus 100 operates is described below.

Figure 11:
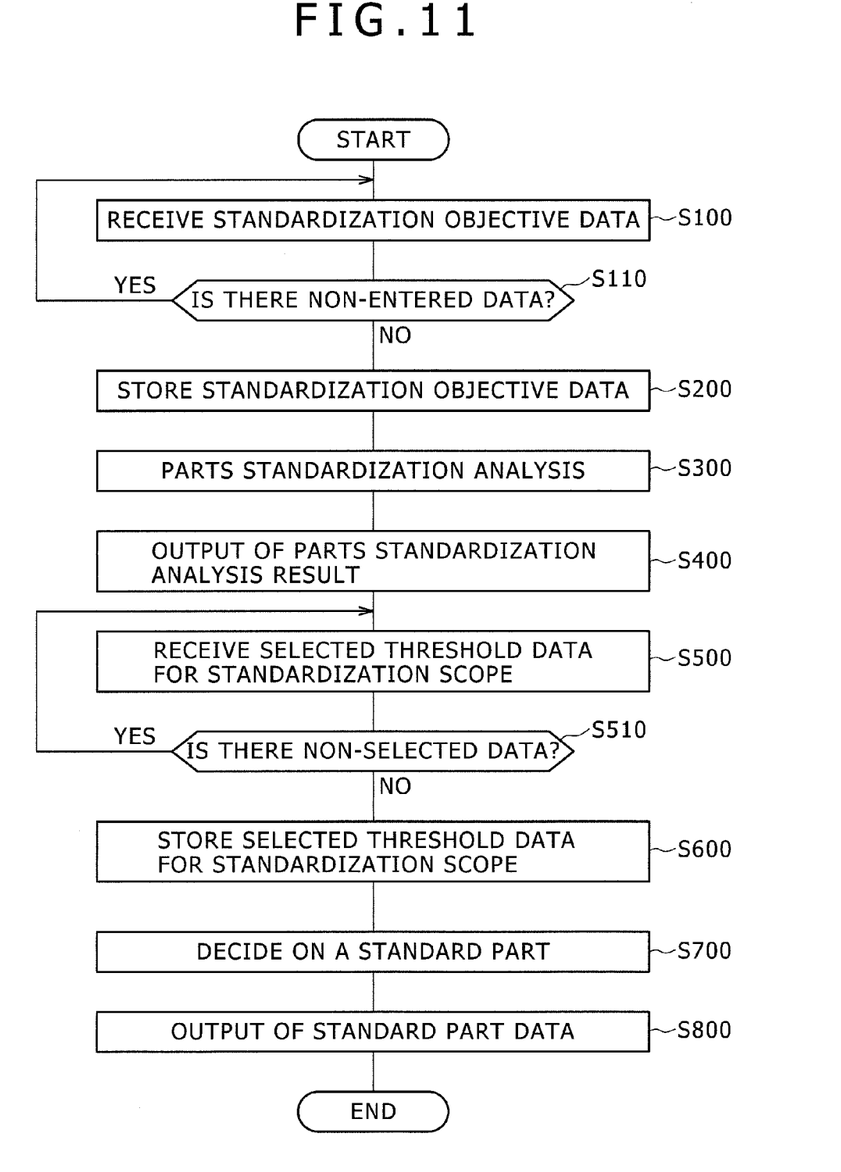
FIG. 11 is a flowchart illustrating an entire process that is performed by the products information management assistance apparatus according to an embodiment of the present invention.

As is presented in a flowchart of FIG. 11, first, the standardization objective input unit 110 in the products information management assistance apparatus 100 receives various data for a standardization objective via the input/output unit 170 (S100). When executing this step, the standardization objective input unit 110 causes the input/output unit 170 to display a standardization objective data input screen 171 which is presented in FIG. 14. In this input screen 171, there are the following: a field for selecting an objective part name 171a, where the name of an objective part for which a standardization analysis is performed is selected; a field for selecting an effect indicator 171b, where the name of an effect indicator which is taken as an analysis axis of a parts standardization analysis is selected; a field for inputting a target level of effect 171c, where a target level of a selected effect indicator is input; and an Execute button 171d which commands the apparatus to execute a standardization analysis.

Figure 14:
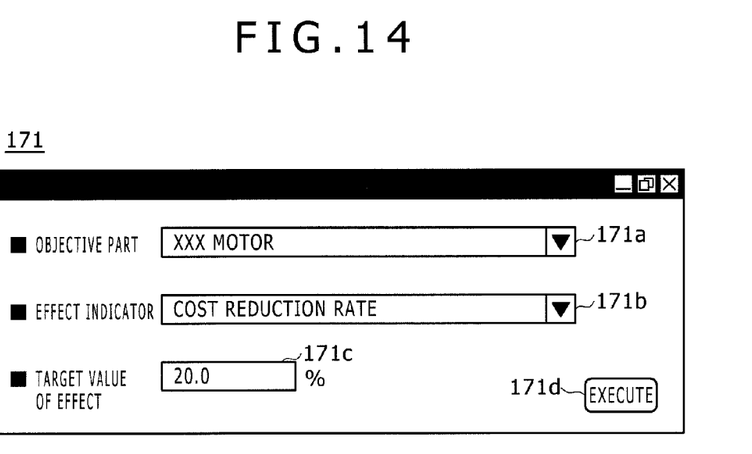
FIG. 14 presents an example of a standardization objective data input screen according to an embodiment of the present invention.

A user of the products information management assistance apparatus 100 views this input screen 171 and, by operating the input/output unit 170, selects an objective part in the input field for an objective part name 171a. Also, the user selects an effect indicator in the input field for an effect indicator 171b and enters a target level of effect in the input field for a target level of effect 171c.

Upon completing entry in all the above input fields or the like 171a to 171c, the user presses the Execute button 171d in the input screen 171. If the user pressed the Execute button 171d, while not completing entry in all the input fields or the like 171a to 171c, the standardization objective input unit 110 judges that there is non-entered data (S110) and prompts the user to enter such data. If there is not non-entered data, the standardization objective input unit 110 converts an objective part name it received to a part type ID via the part type data table 181 as in FIG. 2, converts an effect indicator name it received to an effect indicator ID via the standardization effect indicator data table as in FIG. 3, and stores the input data in conjunction with a target level of effect it received and an analysis history ID identifying a processing record of standardization analysis into the corresponding fields of the standardization analysis history data table as in FIG. 4 (S200).

Figure 12:
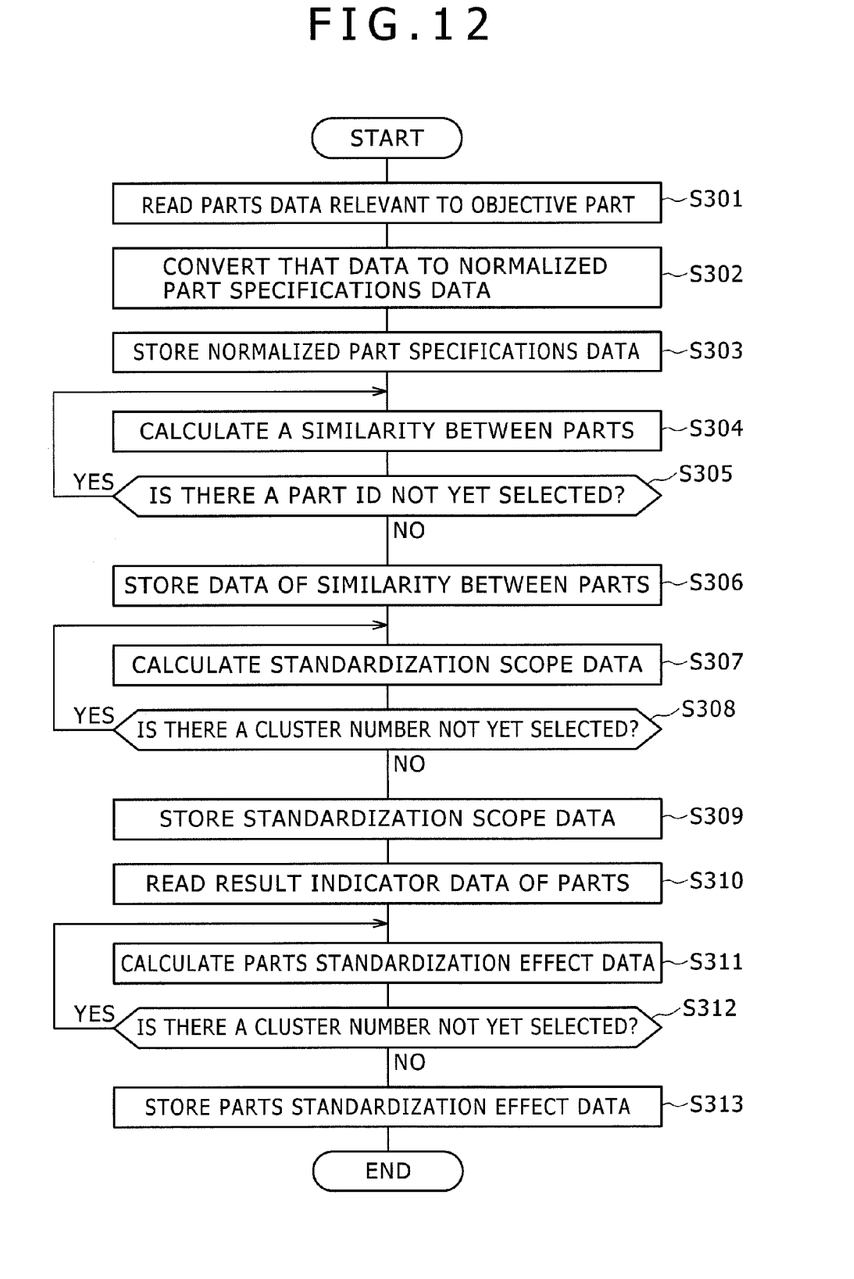
FIG. 12 is a flowchart illustrating a detailed process of parts standardization analysis which is step 300 in the flowchart of FIG. 11.

Now, a process of creating parts standardization analysis information (S300), which is performed by the similarity-between-parts calculating unit 120 and the parts standardization effect calculating unit 130, is described according to a flowchart presented in FIG. 12.

The similarity-between-parts calculating unit 120 reads objective part IDs 184a and particular part specifications data 184f included in the parts data table 184 from the data storage (S301) and performs a process of converting that data to normalized part specifications data (S302). In this process, it converts particular part specifications data that is text data (example: carbon steel and stainless steel as material) to a dummy variable (example: for material carbon steel, true=1, not true=0; for material stainless steel, true=1, not true=0). It converts particular part specifications data that is numerical data to a value ranging from 0 to 1 by using the following equation (Equation 1).

$$X_{i,j} = \frac{X_{i,j} - X_{min,j}}{X_{max,j} - X_{min,j}} \quad \text{[Equation 1]}$$

In the foregoing equation:

$x_{i,j}$ is a normalized value of a j-th specification item of an i-th part ID;

$X_{i,j}$ is a value of the j-th specification item of the i-th part ID;

$X_{max,j}$ is a maximum value of the j-th specification item in the set of objective part IDs; and $X_{min,j}$ is a minimum value of the j-th specification item in the set of objective part IDs.

Normalized specifications data after being converted is stored into the corresponding fields of the normalized part specifications data table 185 as in FIG. 6 (S303).

Next, the similarity-between-parts calculating unit 120 reads normalized part specifications data for objective part IDs from the normalized part specifications data table 185, extracts data for an arbitrary pair of part IDs selected from among the objective part IDs, and calculates a similarity between parts $S_{uv}$ by using the following equation (Equation 2) (S304).

$$S_{uv} = 1 - \frac{\sqrt{\sum_{j=1}^{n}(X_{u,j} - X_{v,j})^2}}{n} \quad \text{[Equation 2]}$$

In the foregoing equation:

$S_{uv}$ is a similarity between a u-th part ID and a v-th part ID in terms of their particular part specifications data;

$X_{u,j}$ is a normalized value of a j-th specification item of the u-th part ID;

$X_{v,j}$ is a normalized value of a j-th specification item of the v-th part ID; and n is the number of specification items.

Similarity $S_{uv}$ may be obtained, for example, by Equation 2 based on an Euclidean distance which is the simplest one of similarity calculation methods. However, other methods such as a similarity calculus equation based on a Mahalanobis distance and a similarity calculus equation based on a Manhattan distance may be used.

Similarity $S_{uv}$ that is obtained by Equation 2 takes a value ranging from 0 to 1 and a value closer to 1 indicates a higher similarity.

The similarity-between-parts calculating unit 120 then judges whether there is a part ID not yet selected from among the objective part IDs 185a (S305) and repeats the similarity calculation operation according to Equation 2 until there is no longer a part ID not yet selected. Upon judging that there is no longer a part ID not yet selected, the similarity-between-parts calculating unit 120 stores results of the similarity calculation into the corresponding fields of the similarity between parts, data table 186 as in FIG. 7 (S306).

Next, the similarity-between-parts calculating unit 120 reads data of similarity between parts from the similarity between parts data table 186, selects one of arbitrary cluster numbers less than the number of the objective part IDs, and calculates an inter-cluster distance d by using the following equation (Equation 3).

$$d(C_1, C_2) = \min_{y_u \in C_1, x_v \in C_2} \frac{\sqrt{\sum_{j=1}^{n}(X_{uj} - X_{vj})^2}}{n} \quad \text{[Equation 3]}$$

In the foregoing equation:

$d(C_1, C_2)$ is a distance between an arbitrary pair of clusters;

$X_{u,j}$ is a normalized value of a j-th specification item of a u-th part ID;

$X_{v,j}$ is a normalized value of a j-th specification item of a v-th part ID; and n is the number of specification items.

Inter-cluster distance $d(C_1, C_2)$ may be obtained, for example, by Equation 3 based on a nearest neighbor method which is the most typical one of cluster analysis methods. However, other methods such as calculus equations based on a furthest neighbor method, a group average method, and a Ward method may be used.

The similarity-between-parts calculating unit 120 then judges whether there is a cluster number not yet selected from among the arbitrary cluster numbers less than the number of the objective part IDs (S308) and repeats the operation of calculating an inter-cluster distance according to Equation 3 until there is no longer a cluster number not yet selected. Upon judging that there is no longer a cluster number not yet selected, the similarity-between-parts calculating unit 120 stores calculation results of inter-cluster distance into the corresponding field of the standardization scope data table 187 as in FIG. 8. Also, the similarity-between-parts calculating unit 120 stores a minimum value of similarity between parts in each cluster number, as data of a threshold of similarity between parts, into the corresponding field of the standardization scope data table 187. Moreover, the similarity-between-parts calculating unit 120 assigns cluster IDs identifying individual clusters in each cluster number and stores the cluster IDs in conjunction with part IDs included in each cluster into the corresponding fields of the standardization scope data table 187 (S309).

Next, the parts standardization effect calculating unit 130 reads data of part IDs in cluster from the standardization scope data table 187 and result indicator data 184e (example: purchase cost) from the parts data table 184 (S310), selects an arbitrary cluster number, and calculates a standardization effect Z by using the following equation (Equation 4) (S311).

$$Z = \frac{\sum W_i - \sum Wmin_i}{\sum W_i} \times 100 \quad \text{[Equation 4]}$$

In the foregoing equation:

Z is a standardization effect yielded by an arbitrary cluster number;

$W_i$ is result indicator data of an i-th part ID; and $Wmin_i$ is a minimum value of result indicator data among part IDs in a cluster including the i-th part ID.

Standardization effect Z may be obtained, for example, by a calculus equation as in Equation 4 in the case of purchase cost; however, other methods may be used.

The parts standardization effect calculating unit 130 then judges whether there is a cluster number not yet selected from among the cluster numbers that are valid (S312) and repeats the operation of calculating a standardization effect according to Equation 4 until there is no longer a cluster number not yet selected. Upon judging that there is no longer a cluster number not yet selected, the parts standardization effect calculating unit 130 stores calculation results of parts standardization effect into the corresponding field of the parts standardization effect data table 188 as in FIG. 9 (S313).

The process of creating parts standardization analysis information (S300) now terminates, which is performed by the similarity-between-parts calculating unit 120 and the parts standardization effect calculating unit 130.

Again, the process according to the flowchart presented in FIG. 11 is further described.

Figure 15:
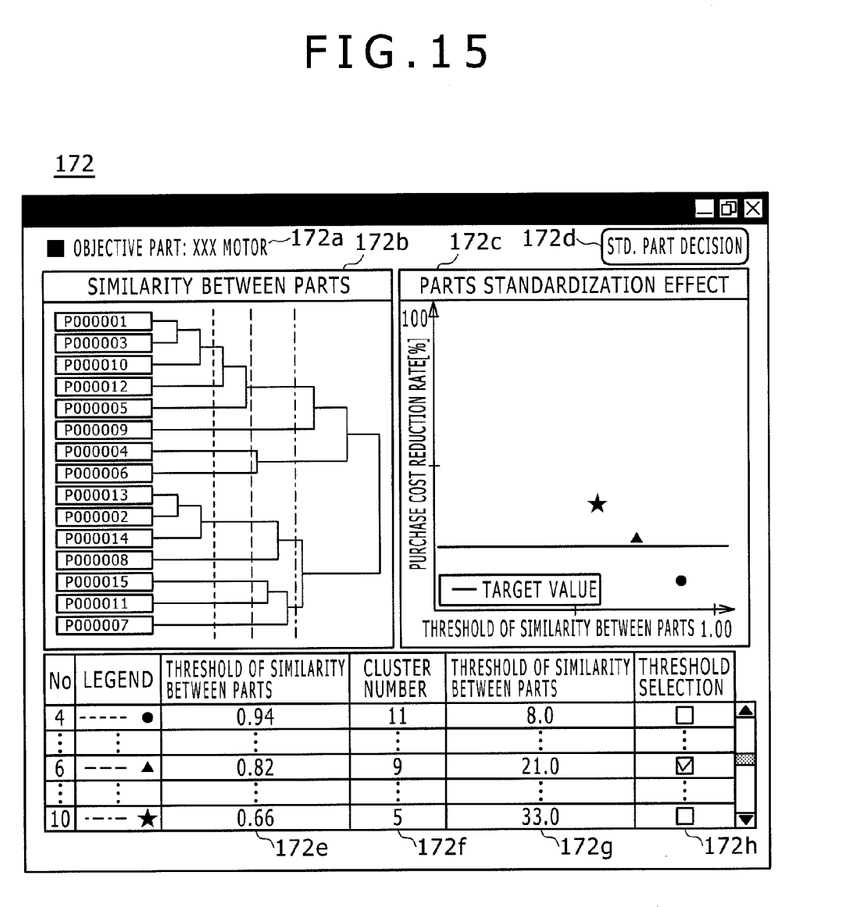
FIG. 15 presents an example of parts standardization analysis result input/output screen according to an embodiment of the present invention.

Upon the termination of the process of creating parts standardization analysis information (S300), the parts standardization analysis result input/output unit 150 causes the input/output unit 170 to display a parts standardization analysis result output screen 172 which is presented in FIG. 15 (S400).

On this output screen 172, the following appear: an objective part name field 172a; a display area for a graph of similarity between parts 172b; a display area for a graph of parts standardization effect 172c; a standard part decision button 172d; a threshold of similarity between parts field 172e; a cluster number field 172f; a parts standardization effect field 172g; and a threshold selection field 172h.

A user of the products information management assistance apparatus 100 views this parts standardization analysis result output screen 172 and, by operating the input/output unit 170, selects a threshold of similarity between parts to be applied as a threshold for defining a standardization scope in the threshold selection field 172h.

Upon having selected a threshold in the selection field 172h, the user presses the standard part decision button in the input screen 172. Then, the parts standardization analysis result input/output unit 150 receives threshold selection flag data via the input/output unit 170 (S500).

If the user pressed the standard part decision button 172d, while not having selected a threshold in the threshold selection field 172h, the parts standardization analysis result input/output unit 150 judges that there is non-selected data (S510), and prompts the user to select such data. If there is not non-selected data, the parts standardization analysis result input/output unit 150 stores threshold selection flag data into the corresponding field of the parts standardization effect data table 188 as in FIG. 9 (S600).

Figure 13:
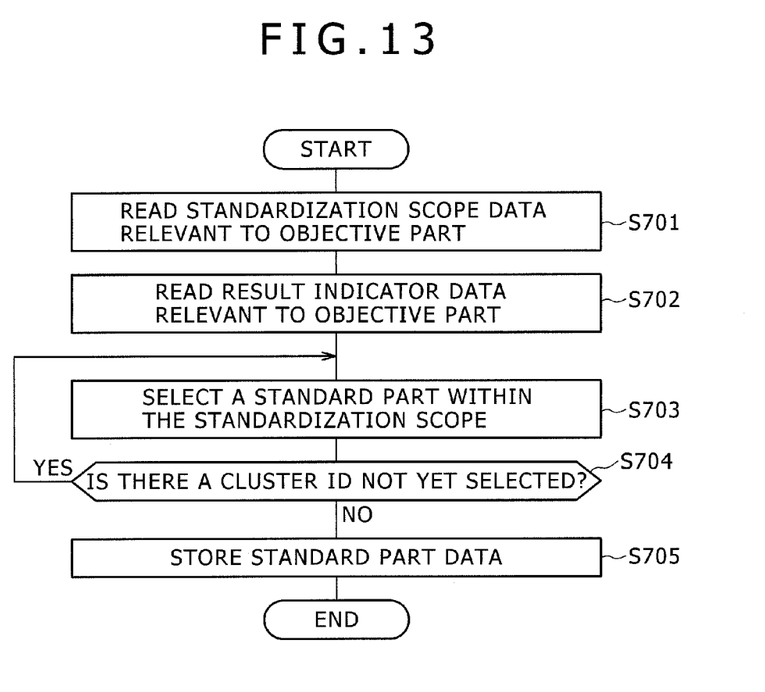
FIG. 13 is a flowchart illustrating a detailed process of standard part decision which is step 700 in the flowchart of FIG. 11.

Now, a process of creating standard part information (S700), which is performed by the standard part decision unit 140, is described according to a flowchart presented in FIG. 13.

The standard part decision unit 140 reads data of part IDs in cluster 187e included in the standardization scope data table 187 and result indicator data 184e included in the parts data table 184 from the data storage 180 (S701, S702) and selects an arbitrary cluster ID in the cluster number selected according to the user's threshold selection. It then selects a part ID for which the result indicator data is best (example: the lowest purchase cost in the case of purchase cost) from among part IDs in the cluster as a standard part (S703).

The standard part decision unit 140 then judges whether there is a cluster ID not yet selected (S704) and repeats the operation of deciding on a standard part until there is no longer a cluster ID not yet selected. Upon judging that there is no longer a cluster ID not yet selected, the standard part decision unit 140 stores results of standard part decision into the corresponding field of the standard part data table 189 as in FIG. 10 and the standard part ID field 184d of the parts data table 184 as in FIG. 5.

The process of creating standard part information (S700) now terminates, which is performed by the standard part decision unit 140.

Again, the process according to the flowchart presented in FIG. 11 is further described.

Figure 16:
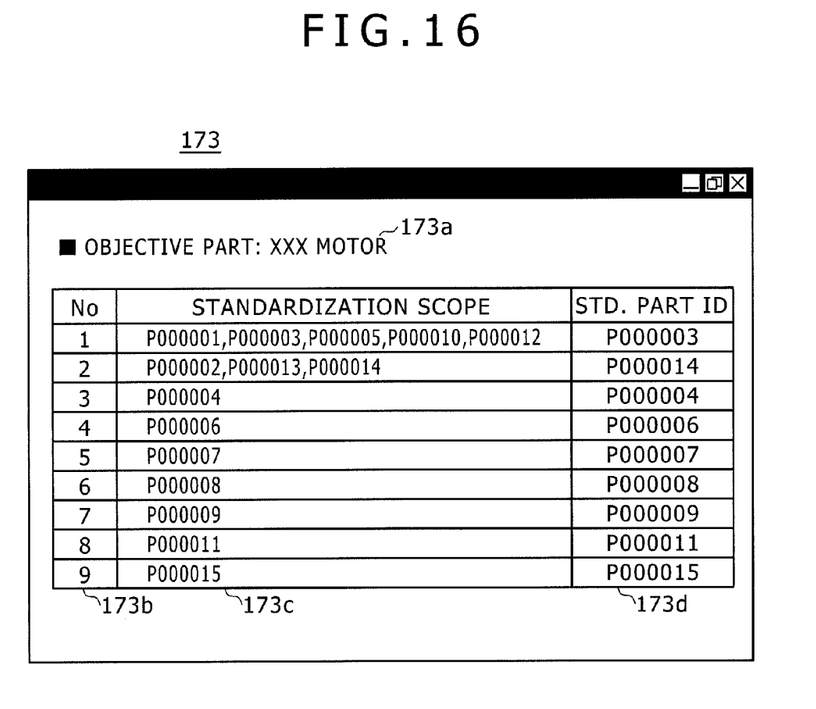
FIG. 16 presents an example of a standard part data output screen according to an embodiment of the present invention.

Upon the termination of the process of creating standard part information (S700), the standard part data output unit 160 causes the input/output unit 170 to display a standard part data output screen 173 which is presented in FIG. 16 (S800).

On this output screen 173, the following appear: a part name field 173a for the objective part; a part ID field 173c; and a standard part ID field 173d.

In the present embodiment described hereinbefore, a standardization analysis is performed for an objective part and calculation results of similarity between parts and calculation results of standardization effect relevant to the objective part are presented. Thus, even for complex parts defined by a number of specification items, it is possible to select a standard part based on past products information independently of information which is arbitrarily input by a user. Also in the present embodiment, because final standard part selection results are presented and stored in a parts database, it is possible to assist in enhancing utilization of standard parts.

Although a purchase cost reduction rate is used to indicate a standardization effect in the present embodiment, the present invention is not so limited; a design cost reduction rate, an inspection cost reduction rate, a rate of satisfying customer-required specifications, etc. may be used to indicate a standardization effect.

What is claimed is:
1. A products information management assistance apparatus that decides on standard part information based on past products information records, the products information management assistance apparatus comprising:
    a processor; a data storage; and an input/output unit, wherein the data storage comprises:
    a first data table configured to store entries of, at least, objective part's type identifier, effect indicator identifier, and a target value of effect;
    a second data table including entries of, at least, part identifiers registered in past delivery records, result indicator, and part specifications;
    a third data table configured to store calculation results of similarity between parts;
    a fourth data table configured to store entries of, at least, cluster number, a distance between clusters, a threshold of similarity between parts, cluster identifier, and part identifiers in cluster;
    a fifth data table configured to store calculation results of standardization effect if a plurality of parts have been standardized and consolidated according to a threshold of similarity between parts per cluster number; and
    a sixth data table configured to store entries of, at least, cluster identifier, part identifiers in cluster, and standard part identifier, and
wherein the processor is in communication with the data storage and the input/output unit and comprises:
an input unit configured to:
receive data selected and entered by a user in terms of an objective part name, an effect indicator name, and a target value of effect via the input/output unit,
store the data in the first data table in the data storage;
a similarity-between-parts calculating unit configured to:
receive the part identifiers and the part specifications from the second data table,
normalize the part specifications,
calculate a similarity between an arbitrary pair of parts,
store the calculation results of the similarity between the parts in the third data table, select an arbitrary cluster number less than the number of objective part identifiers, calculate a distance between an arbitrary pair of clusters for all combinations of clusters, and store a minimum value of similarity between the parts in each cluster number as a threshold of similarity between the parts in the fourth data table;

a parts standardization effect calculating unit configured to:

calculate a standardization effect per the cluster number based on part identifiers in cluster from the fourth data table and result indicator data from the second data table, and store the calculation results of the standardization effect in the fifth data table;

a parts standardization analysis result input/output unit configured to:

receive standardization effect data from the fifth data table, display parts standardization analysis results in conjunction with a standardization scope of relevant parts registered in records and a standardization effect using the input/output unit, and receive a user-selected threshold of similarity between parts;

a standard part decision unit configured to:

select based on data of part identifiers in cluster for the cluster number associated with the user-selected threshold of similarity between the parts from the fourth data table and result indicator data from the second data table, from among the parts identifiers in cluster a part identifier for which the result indicator data is best as a standard part and store the part identifier in the sixth data table; and a standard part data output unit configured to display a standard part data output screen using the input/output unit.

2. The products information management assistance apparatus according to claim 1, wherein the similarity-between-parts calculating unit is configured to calculate the similarity between the arbitrary pair of parts using a normalized value of each specification item and by a similarity calculation method based on an Euclidean distance, a Mahalanobis distance, or a Manhattan distance.

3. The products information management assistance apparatus according to claim 1, wherein the similarity-between-parts calculating unit is configured to calculate the distance between the arbitrary pair of clusters using a normalized value of each specification item of each part identifier included in each cluster and by a cluster analysis method based on a nearest neighbor method, a furthest neighbor method, a group average method, or a Ward method.

4. The products information management assistance apparatus according to claim 1, wherein the parts standardization analysis result input/output unit is further configured to:

receive data from the first, third, fourth, and fifth data tables, display a graphical presentation of relationships between parts having a high similarity between parts, a graphic presentation of a parts standardization effect in which standardization effect data per cluster number is plotted on coordinates with a threshold of similarity between parts plotted along a horizontal axis and an effect indicator plotted along a vertical axis, and data from the fifth data table on a parts standardization analysis result output screen, and receive a user-selected threshold of similarity between parts.

* * * * *